United States Patent [19]

Peterson et al.

[11] Patent Number: 5,227,719
[45] Date of Patent: Jul. 13, 1993

[54] DRIVE AXLE IN-AXLE ANNULAR SPEED SENSOR

[75] Inventors: Glen D. Peterson, Battle Creek; Laverne A. Caron, Kalamazoo, both of Mich.

[73] Assignee: Eaton Corporation, Cleveland, Ohio

[21] Appl. No.: 622,108

[22] Filed: Dec. 3, 1990

Related U.S. Application Data

[63] Continuation-in-part of Ser. No. 578,383, Sep. 7, 1990, abandoned.

[51] Int. Cl.[5] ............................ G01P 3/48; G01B 7/14
[52] U.S. Cl. ................................. 324/174; 324/207.13; 324/207.22; 324/207.25; 310/168
[58] Field of Search .................... 324/173, 174, 207.11, 324/207.13, 207.15, 207.22, 207.25, 226; 310/168, 68 B

[56] References Cited

U.S. PATENT DOCUMENTS

| | | | |
|---|---|---|---|
| 2,462,761 | 2/1949 | Momberg | 310/168 |
| 3,739,211 | 6/1973 | Hasler | 310/168 |
| 4,027,753 | 6/1977 | Lantz | 310/168 |
| 4,159,433 | 6/1979 | Takayama et al. | 310/168 |

Primary Examiner—Walter E. Snow
Attorney, Agent, or Firm—H. D. Gordon

[57] ABSTRACT

An in-axle annular rotational speed sensor assembly (52) for drive axles (10) is provided which mounts directly to the drive axle differential bearing adjusters (36) in a relatively available and protected space (50) within the axle housing. The assembly utilizes the ferromagnetic adjuster to define a portion of the magnetic flux path (108) and maintains a large axial separation between the adjuster and the air gap (102) between the arrays of rotor and stator teeth (82, 100).

29 Claims, 9 Drawing Sheets

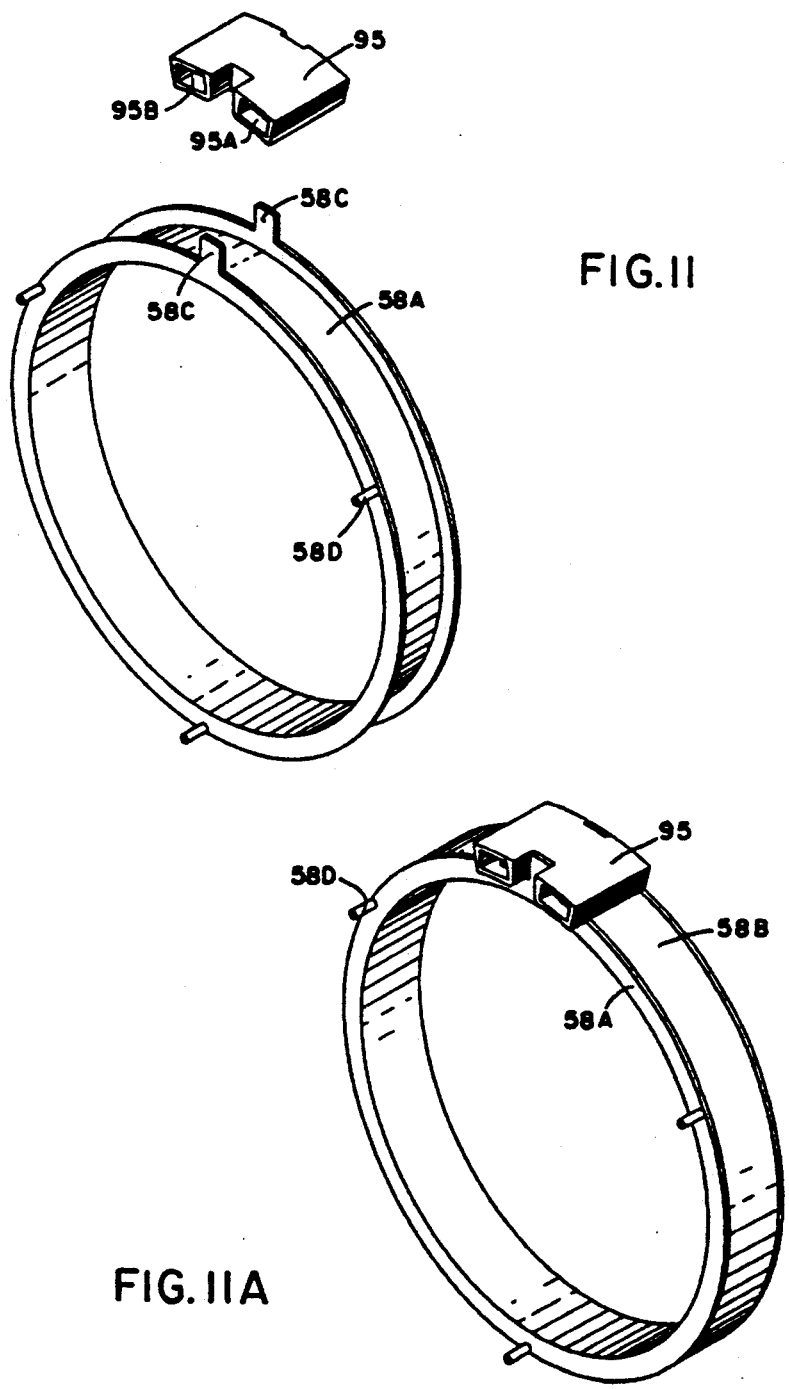

DRIVE AXLE IN-AXLE ANNULAR SPEED SENSOR

RELATED APPLICATIONS

This application is a Continuation-In-Part application of U.S. Ser. No. 578,383 filed Sep. 7, 1990 and assigned to the same assignee as this application, now abandoned.

BACKGROUND OF THE INVENTION

1. Field of the Invention

The present invention relates to an in-axle rotational speed sensor assembly for mounting to a fixed metallic (magnetic) member, such as a drive axle differential bearing adjustor, having a central opening therethrough for receipt of rotatable member, such as a shaft, the rotational speed of which is to measured.

2. Description of the Prior Art

Automated vehicular systems such as brake control systems, antilock brake systems (ABS), traction control systems, differential lock-up systems and the like which utilize rotational speed sensors to provide a control input signal, usually indicative of wheel speed, to a controller, such as a microprocessor based electronic control unit (ECU), are well known in the prior art. Examples of such systems and/or sensors may be seen by reference to U.S. Pat. Nos. RE 30,522; 3,961,215; 3,929,382, 3,556,610; 3,604,760; 4,585,280; 4,361,060; 3,768,840; 4,818,035 and 4,863,221, the disclosures of all of which are hereby incorporated by reference.

Typically, such rotational speed sensor assemblies are electromagnetic in nature and rely on the alignment of rotor teeth, or spaces between rotor teeth, rotating past a sensor to complete or break, respectively, a magnetic flux path to produce a digital or analog signal indicative of the rotational speed of the rotor.

Placement of wheel-speed sensor assemblies within the axle (i.e. "in-axle") to protect same is also known as may be seen by reference to U.S. Pat. Nos. 3,769,533; 4,724,935; 4,836,616, 4,862,025 and 4,862,028, the disclosures of which are hereby incorporated by reference.

The use of annular rotational speed sensor assemblies comprising an annular toothed stator/sensor which surrounds a rotating toothed rotor, or visa versa, is known in the prior art. Annular speed sensor assemblies are preferred over single or multiple point type sensor assemblies in certain situations as they provide a relatively high signal to noise ratio, tend to be self-compensating for run-out errors between the rotor and stator, and require little or no adjustment. Examples of wheel-end and/or in-axle annular speed sensor assemblies may be seen by reference to U.S. Pat. Nos. 4,870,911; 4,027,753 and 4,689,557, the disclosures of which are incorporated herein by reference.

The prior art in-axle wheel speed sensors, especially those designed for use with drive axles, were not totally satisfactory as they were point type not annular speed sensor assemblies and/or were not suitable for directly monitoring the speeds of both drive axle axle shafts and/or they were located at or adjacent the axle wheel ends, and not in the relatively more protected central portions adjacent the axle drive gearing.

SUMMARY OF THE INVENTION

In accordance with the present invention, the drawbacks of the prior art have been minimized or overcome by the provision of an annular in-axle wheel speed sensor assembly for drive axles which is mounted in-axle at or adjacent to the relatively protected center of the drive axle assembly at either or both of the differential bearing adjustment members, which provides a pilot portion for axle shafts which are inserted through an opening in the bearing adjustor for driving engagement with the differential side gearing and which requires no adjustment. The above is accomplished by providing an annular in-axle wheel speed sensor for a drive axle which mounts to the drive axle differential bearing assembly adjustment member, which includes pilot means to assist assembly of the axle shafts to the drive axle differential side gearing and which requires no adjustment. Further, with relatively minor modifications, the sensor assembly may be modified for use with a wide variety of drive axles.

This and other objects and advantages of the present invention will become apparent from a reading of the description of the preferred embodiment taken in connection with the attached drawings.

BRIEF DESCRIPTION OF THE DRAWINGS

FIG. 11 and 11A show exploded and assembled perspective views, respectively, of the coil bobbin and terminal block connector of the annular speed sensor assembly of the present invention.

DESCRIPTION OF THE PREFERRED EMBODIMENT

Figure 1:
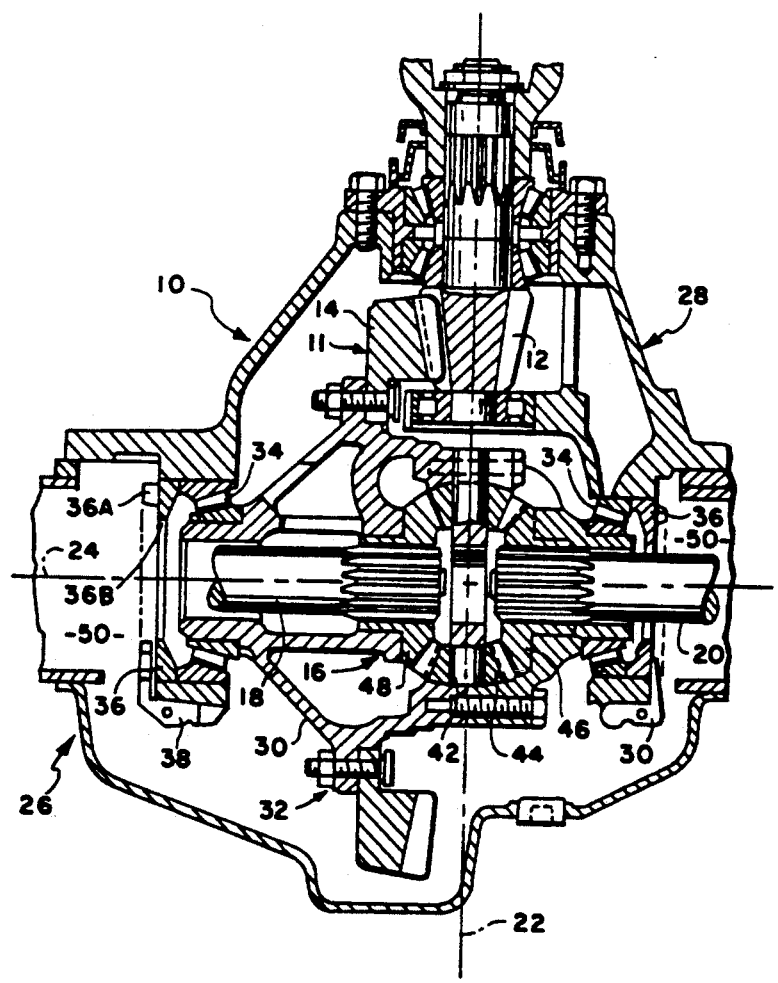
FIG. 1 is a partial sectional view of a typical prior art drive axle.
Figure 2:
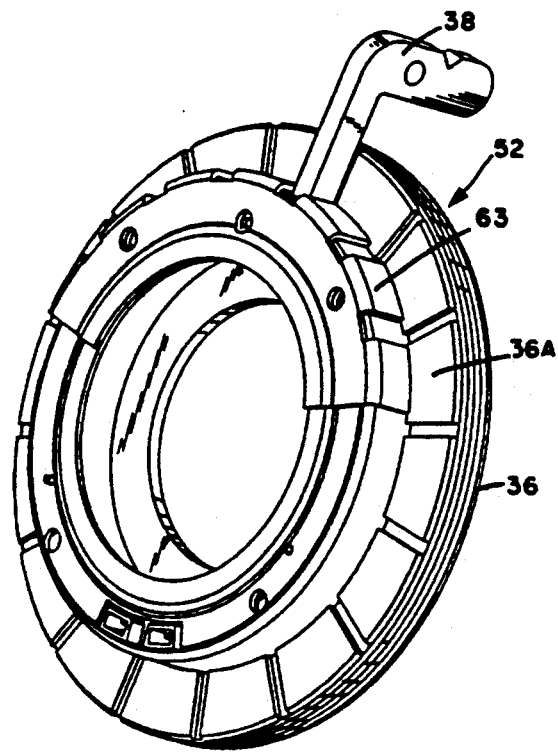
FIG. 2 is a perspective view of a portion of the annular wheel speed assembly of the present invention.
Figure 3:
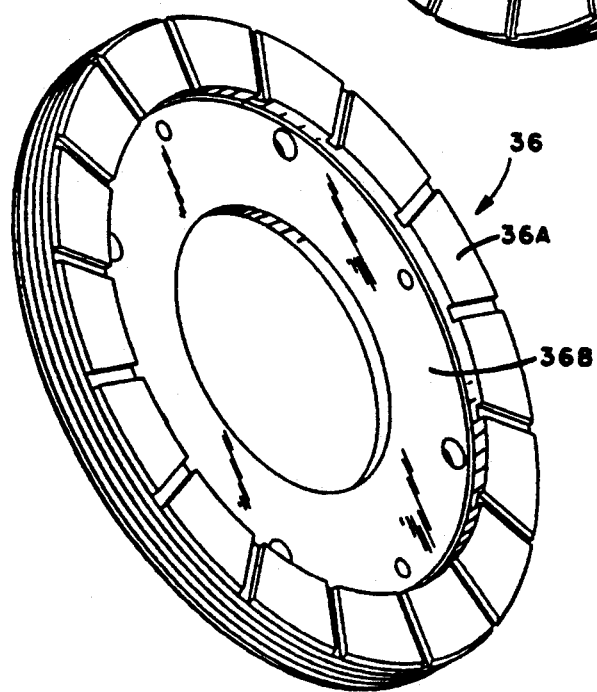
FIG. 3 is a partially sectioned perspective view of the bearing adjuster of the present invention.
Figure 4:
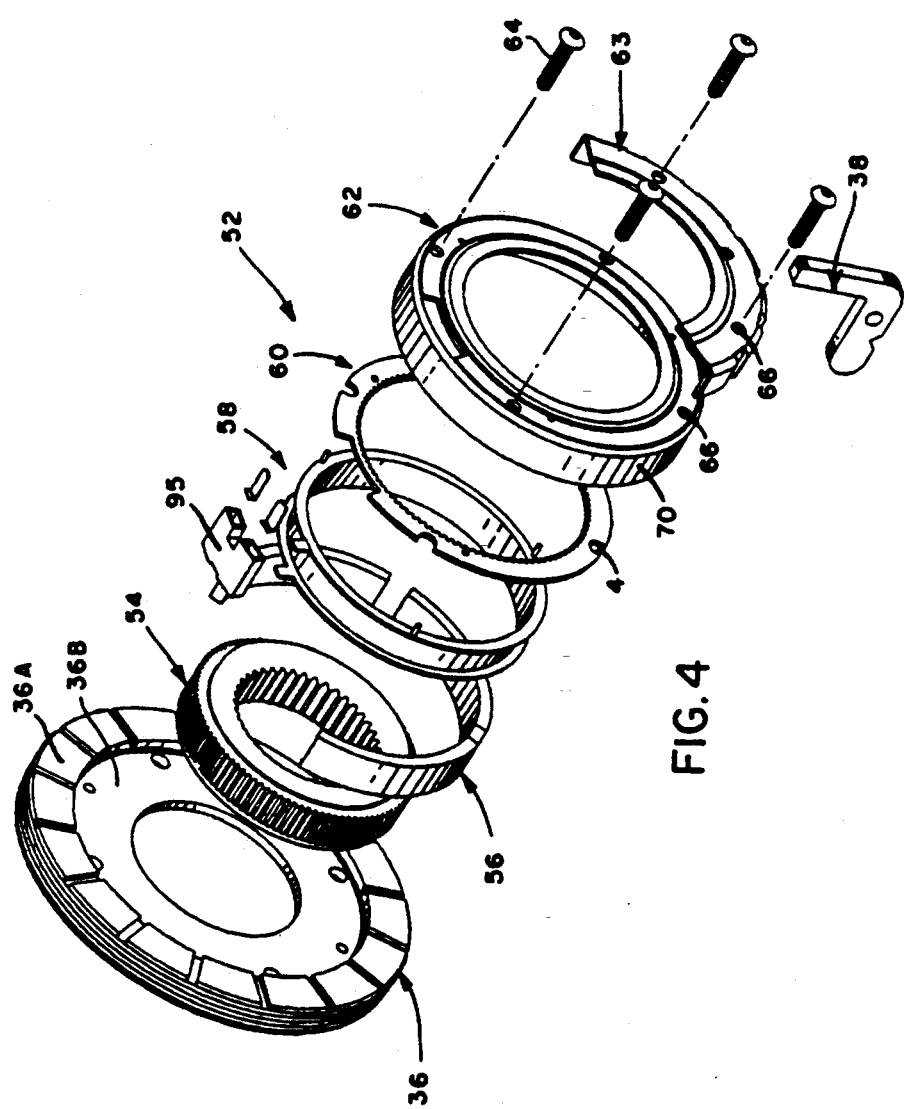
FIG. 4 s an exploded view of the annular wheel speed sensor assembly of the present invention.
Figure 6:
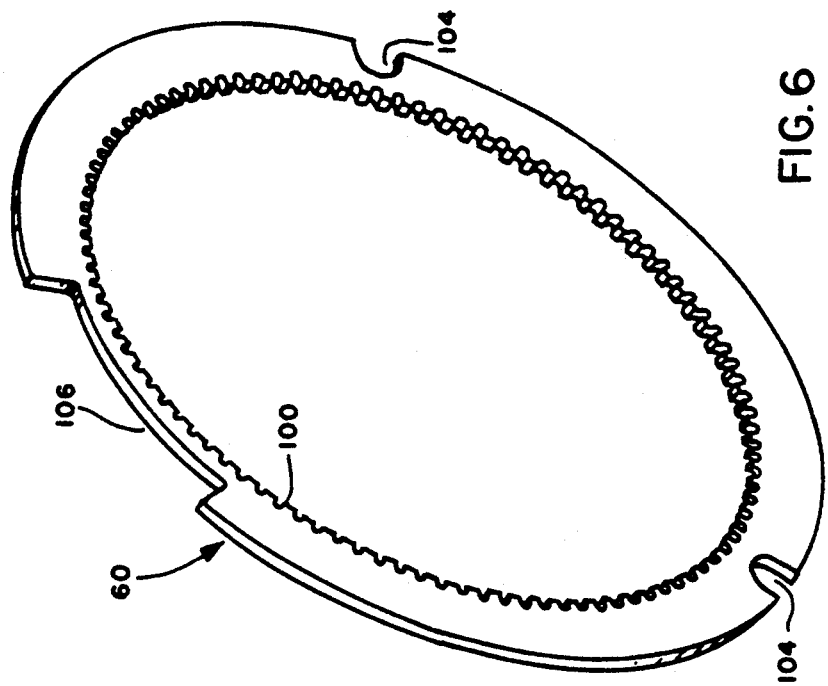
FIG. 6 is a perspective view of the stator member of the sensor assembly of FIG. 2.
Figure 5:
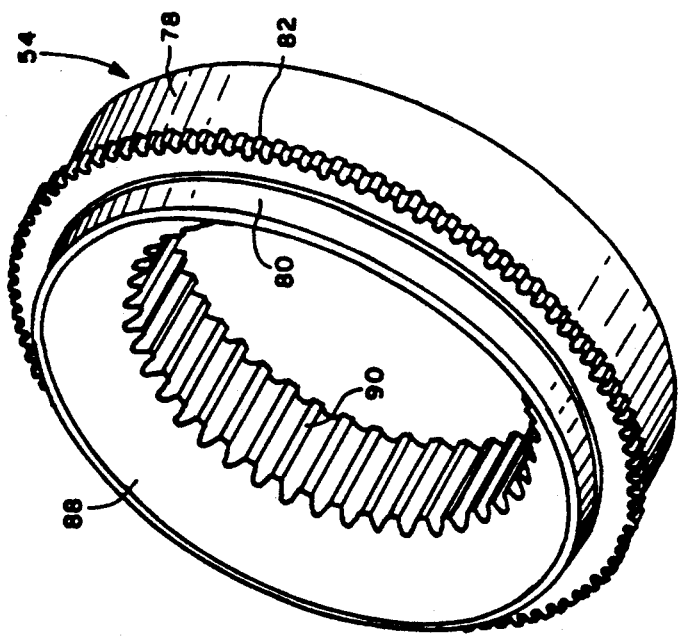
FIG. 5 is a perspective view of the rotor member of the sensor assembly of FIG. 2.
Figure 7:
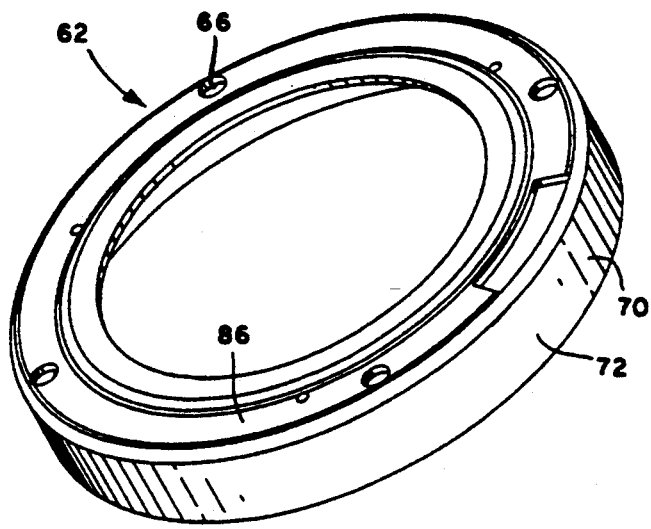
FIG. 7 and 7A are perspective views of the cover member of the sensor assembly of FIG. 2.
Figure 7A:
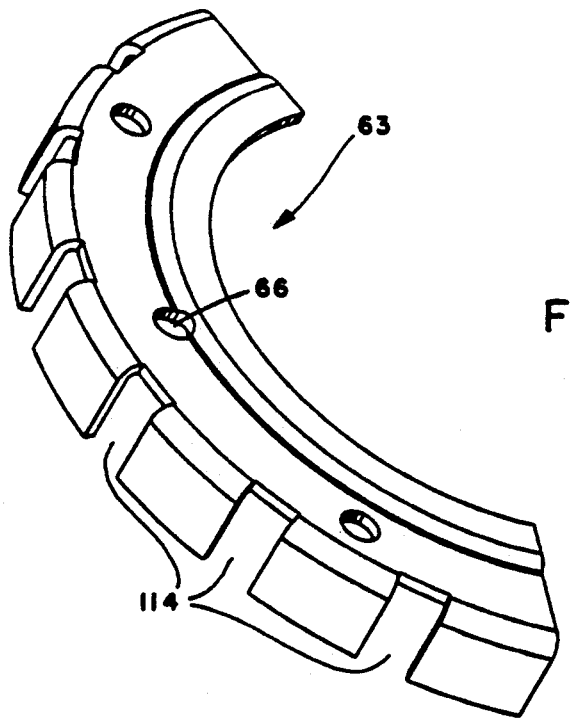

In the following description of the preferred embodiment, certain terms will be used for convenience in reference only and are not intended to be limiting. The terms "upwardly", "downwardly", "rightwardly" and "leftwardly" will designate directions in the drawings to which reference is made. The terms "inboard", and "outboard" will refer respectively to directions towards and away from, the geometric center of the vehicle drive axle as same is conventionally mounted in a vehicle. The terms "inwardly" and "outwardly" will refer to directions towards and away from, respectively, the geometric center of the device and designated parts thereof. The above applies to the words above specifically mentioned, derivatives thereof and words of similar import.

Heavy duty drive axles utilizing ring gear/pinion gear right angle gear sets are well known in the prior art. Referring to FIG. 1, a typical prior art differential head assembly 10 of a single reduction drive axle utilizing a gear set 11 comprising a pinion gear 12 meshingly engaged with a ring gear 14 is illustrated. A differential assembly 16 is fixed to the ring gear for driving two axle shafts 18 and 20. Axle shafts 18 and 20 drive the left and right hand, respectively, drive wheels (not shown) as is well known in the prior art. In the axis of rotation 22 of the pinion gear 12 is substantially perpendicular to the axis of rotation 24 of ring gear 14 (and the differential 16 and drive shafts 18 and 20). Heavy duty drive axles of this, and of the two speed planetary double reduction type, are well known in the prior art.

Drive axle assembly 10 also includes an axle housing 26 having a differential head portion 28. The ring gear 14 is mounted for rotation with a differential carrier 30 by means of bolt and nut assemblies 32. The differential carrier is rotationally supported in the housing portion 28 by means of tapered bearings 34 which are adjustably positioned by means of bearing adjustors 36 which are maintained in position by bearing adjustor lock members 38 and unshown bolts. The bearing adjustors 36 include outwardly extending lug members 36A which extend only partially radially inwardly from the outer periphery of the bearing adjusters to define an outboardly facing counterbore on the outboard faces of the bearing adjusters.

The differential carrier 30 carries the differential spider member of 42 and which are rotatably received the differential pinion gears 44. The differential pinion gears are constantly meshed with the righthand and lefthand side gear (46 and 48), respectively, which side gears are rotatably engaged by the drive shafts 20 and 18 by means of a splined connection as is well known in the prior art. The splined connection between the inboard ends of the axle drive shafts and the hub portions of the side gears allows the axle shafts to be assembled to and disassembled from the drive axle gearing by passing same through the arm portions of the housing and centrally located openings or bores 36B in the bearing adjusters.

As may be appreciated by reference to FIG. 1, the spaces designated generally as 50 within the axle housing 28 which are slightly outboard and adjacent the bearing adjusters 36 are relatively well protected and unused spaces which are particularly well suited for receipt of in-axle wheel speed sensors.

The annular in-axle wheel speed sensor assembly 52 of the present invention, which is adapted to be mounted to the outboard faces of one or, preferably, both of the bearing adjustors 36, and thus within space 50 within the axle housing, may be seen by reference to FIGS. 2, 3, 4, 8 and 10. The speed sensor assembly 52 is adapted to be received in and located by the counterbore on the outboard surface of the bearing adjusters defined by the lugs 36A thereof.

Vehicular ABS and automated drive train systems are well known in the prior art and examples thereof may be seen by reference to above-mentioned U.S. Pat. Nos. 3,920,284; 3,929,382; 4,168,866; 4,478,840; 4,818,035; 4,863,212; 4,361,060; 4,527,447; 4,643,048 and 4,860,861. Speed sensor assemblies for providing input signals to control units, usually microprocessor based central processing units, are well known in the prior art as may be seen by reference to above-mentioned U.S. Pat. Nos. RE 30522; 3,961,215; 4,862,025; 4,862,028 and 4,893,075.

Typically, such speed sensor assemblies include a magnet, a coil, a tooth ferromagnetic rotor which is keyed to a monitored shaft for rotation therewith and a stator or sensor member rotationally fixed relative to a vehicle component. Usually, rotation of the rotor tooth and tooth spaces past the stator or sensor will result in the making and then breaking of a magnetic flux path which will result in pulses of increasing and decreasing induced current in the coil, the frequency and/or voltage of the induced current being indicative of the rotational speed of the rotor and those members rotating therewith. Of course, the rotor teeth may be replaced by undulations, apertures, etc.

The annular speed sensor assembly 52 of the present invention includes a ferromagnetic rotor member 54, a substantially annular permanent magnet 56, an annular coil member assembly 58, an annular ferromagnetic stator member 60 and an annular cover member 62 which is preferably of a relatively nonmagnetic flux conducting material such as stainless steel or brass or the like. A plurality of bolts or machine screws 64 are received through bolt holes 66 provided in the cover member 62 and are threadably engaged in internally threaded bores 68 provided in the adjuster members 36 to axially and rotationally mount the speed sensor assembly 52 to the outboard face of the adjuster member 36. The cover member 62 includes an axially extending wall 70 having an outer diameter surface 72 with an outer diameter just slightly less than inner diameter 74 of the counter bore defined on the outwardly facing surface of the bearing adjuster 36 by the lug members 36A whereby the assembly 52 is correctly radially positioned relative to the drive axle assembly.

Preferably the bolts or machine screws 64 are of a nonferrous material and/or nonferrous spacers or sleeves are utilized therewith.

Figure 9:
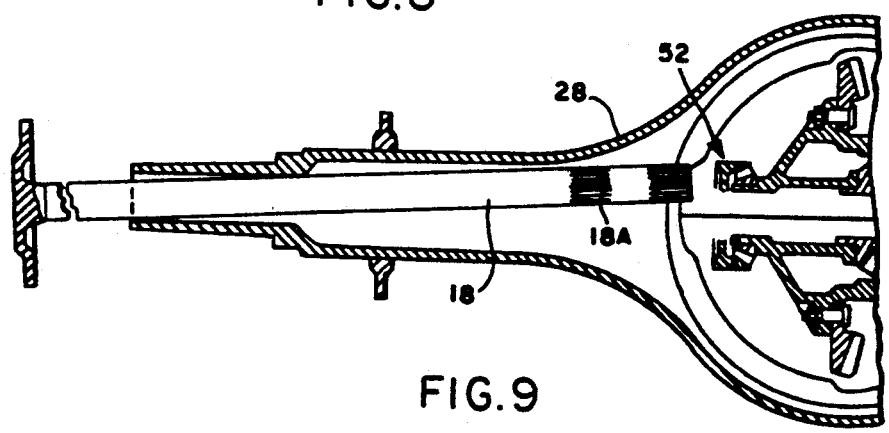
FIG. 9 is a partial schematic top view illustrating the type of assembly error that is protected against by the sensor assembly of the present invention.

The ferromagnetic rotor 54 includes an inboardly facing surface 76 for close abutment with the outboardly facing surface or face 36C of the bearing adjuster 36, and an axially extending outer diameter surface comprising an inboard portion 78, an outboard portion 80 and a radially outwardly extending array of teeth 82 interposed the inboard and outboard portions of the outer diameter surface. The radially outwardly extending teeth 82, define an outwardly facing abutment surface 84 which cooperates with the radially inwardly extending wall portion 86 of the cover member 62 to axially locate the rotor member 54. The outboard end of the rotor 54 extends axially outwardly from the other components of the speed sensor assembly 52 and defines a radially and axially inwardly tapered pilot surface 88 extending axially inwardly and radially downwardly to internal splines 90 which are intended for cooperation with external splines or projections (18A, see FIG. 10) to be provided on modified axle shafts whereby the rotor 54 will rotate with the axle shafts. The axially outwardly extending portion of the rotor 54 and the pilot or chamfer surface 88 both protects the speed sensor assembly 52 from the ends of axle shafts during assembly of the axle shafts to the differential side gears (see FIG. 9) and also pilots the ends of the axle shafts to ease such assembly.

An annular coil member assembly 58 telescopically surrounds the inboard outer diameter surface 78 of the rotor. The coil assembly 58 includes a nonmagnetic bobbin member 58A which supports the coil windings 58B. To provide increased reliability of the sensor, preferably the coil is wound of a copper, nickel, plated copper or other special alloy coil wire and the outer layer of the coil may be of a heavier gauge wire. For coils of this type, 1,600 to 2,500 turns per inch is typical.

A pair of terminal connectors 92 and 94 are provided for the connection to the coil member windings for purposes of providing the sensor output signal. The terminal connector assemblies 92/94 are preferably housed in a single terminal block member 95 having two openings 95A and 95B for electrical connection to blade type connectors. The terminal block is located between a pair of tabs 58C provided on the bobbin 58A (see FIGS. 11 and 11A).

Figure 8:
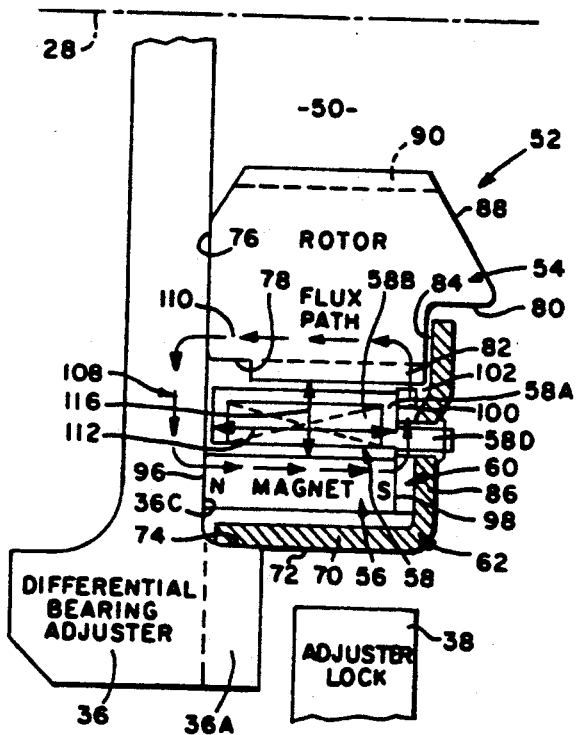
FIG. 8 is an enlarged partial view in section illustrating the magnetic flux path of the wheel speed sensor of FIG. 2.

The bobbin 58A also includes a plurality of extensions 58D which pass through openings provided in cover 62 for attaching the coil assembly 58 and stator 60 to the cover as a preassembled subassembly (see FIG. 8).

An annular split ring type permanent magnet member 56 is telescopically received about the outer diameter of the annular coil member 58. Preferably, the magnet member 56 is a plastic magnet for purposes of conserving weight and for providing added reliability. The magnetic member 56 includes an inboard surface 96 for abutting engagement with the outboard surface 36C of the ferromagnetic bearing adjuster 36 and an outboardly facing surface 98 for abutting engagement with the inboard surface of the stator member 60.

A generally flat washer shaped stator member 60 is axially positioned between the inboard face of the radial wall 86 of the cover member 62 and the outboard face 98 of the permanent magnet 56. The stator includes a plurality of radially inwardly extending teeth 100 which are axially aligned with portions of the radially outwardly extending teeth 82 carried by the rotor 54 and are radially spaced therefrom by an air gap 102. At its outer diameter, the stator member 60 is provided with a plurality of generally concave shaped cut outs 104 allowing passage of the bolt means 64 therethrough and a circumferentially elongated cut out portion 106 allowing passage of the connector block 92/94 axially therethrough. Preferably, the cut-outs 104 are generally radially extending and provide a relatively large clearance with screws 64 allowing the stator to move or float radially into a position of non-contact with the rotating rotor 54.

The flux path 108 defined by the sensor assembly 52 of the present invention may be seen in greater detail by reference to FIG. 8. In the counterclockwise direction, the flux path is from magnet member 56 through ferromagnetic adjustor member 36 into the rotor member 54 from teeth 82 of the rotor to teeth 100 of the stator across the air gap 102, also called the working gap, when the teeth of the rotor and the stator are in circumferential alignment and from the stator back into the magnet member. It is important to note, that by positioning the axially aligned portions of the teeth 82 and 100 remote from the relatively massive ferromagnetic adjuster member 36 and at a position surrounded by the relatively low permeability cover member 62, short circuiting of the magnetic flux path across from the rotor to the stator other than across the air gap 102 when the teeth are in circumferential alignment is minimized.

To provide protection to the coil member 58, magnet member 56 and stator 60, the axial length 110 of surface 78, including teeth 82 is greater than the axial width 112 of the coil member 58 and magnet 56 to prevent jolts on surface 88 from being transmitted to the magnet or coil member during assembly of the axle shaft to the axle differential gearing.

The cover member 62 is provided with a stamped plate 63 having a plurality of cut out portions 114 for cooperation with the locking member 38 whereby the differential adjusting member may be rotationally locked in its selected position.

The cover member 62, stator member 60, coil member 58, and the connector assemblies 92/94 may be formed as a subassembly and electron beam welding of the stainless steel cover member and the coil bobbin to seal the sensor with hermetic seals at the connection points may be utilized. To increase the reliability and to minimize the requirement of servicing, bi-filar coil windings may be utilized for redundancy as may vacuum impregnated coils and soft potting material rather than a rigid epoxy to minimize stress on the coil and termination points.

Figure 10:
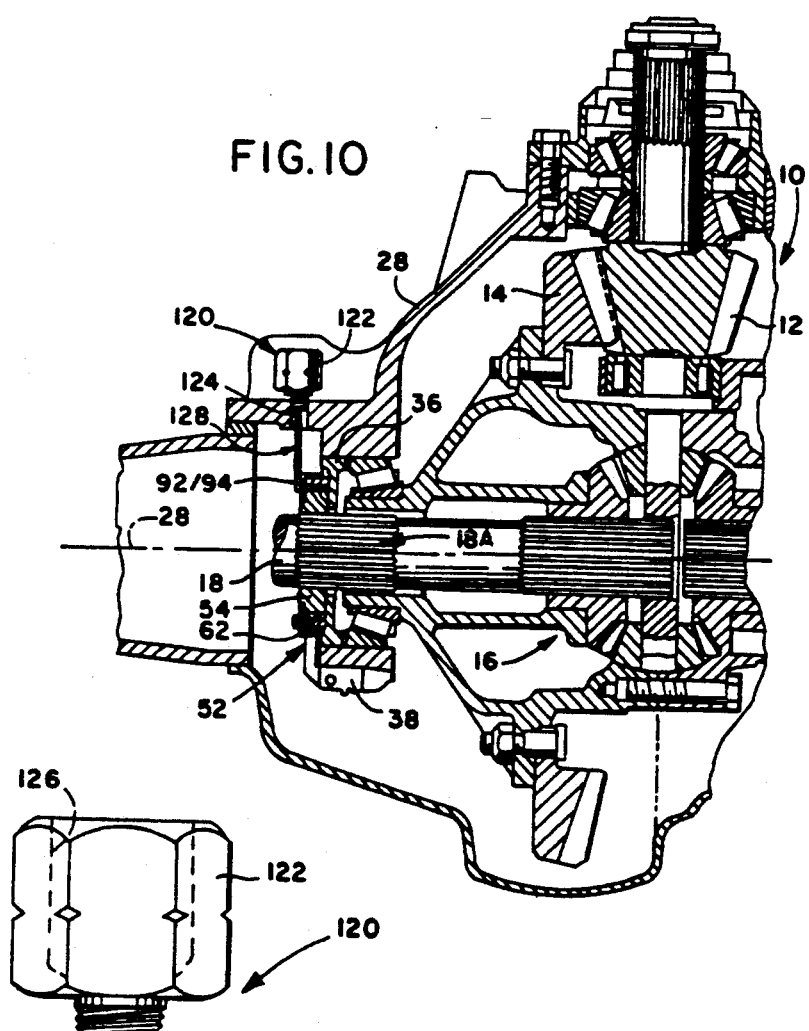
FIG. 10 and 10A are partial top views, in section, illustrating a drive axle with the in-axle annular speed sensors of the present invention assembled thereto.
Figure 10A:
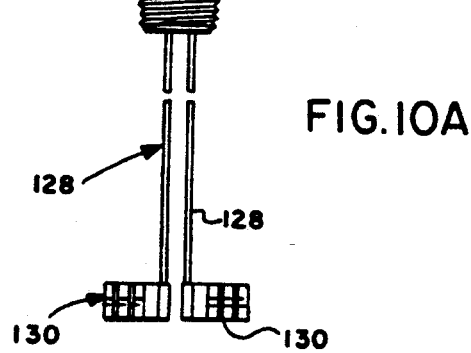

Referring to FIG. 10 and 10A, a connector assembly 120 is provided having a cap portion 122 designed to be sealingly and threadably received in a threaded bore 124 provided in the housing and defining a socket 126. A pair of wires 128 having blade connectors 130 for receipt into openings 95A and 95B of the terminal block extend from the cap member.

Figure 12:
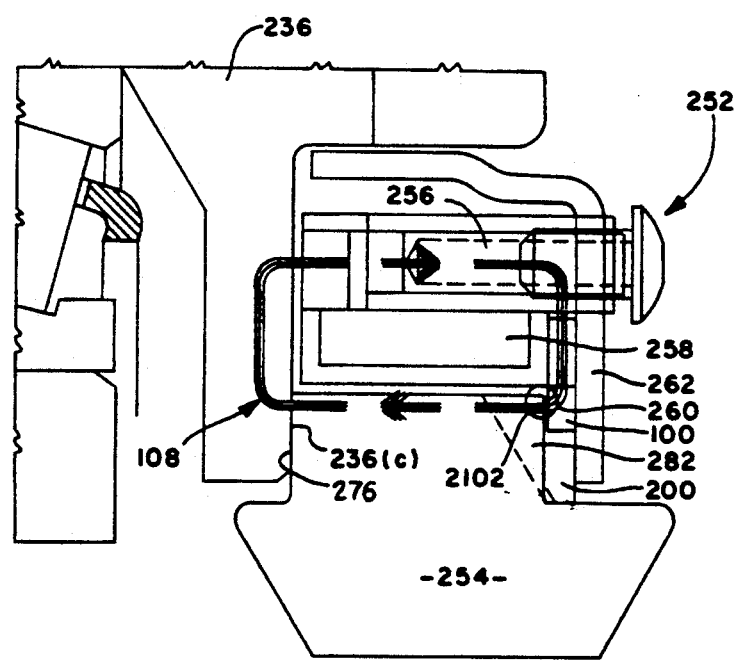
FIG. 12 is an enlarged partial view, similar to FIG. 8 of an alternate embodiment of the present invention.

FIG. 12 is an enlarged view, similar to FIG. 8, of an alternate embodiment 252 of the annular speed sensor assembly of the present invention.

Components of assembly 252 similar in structure and function to those illustrated in FIG. 8 and described above will be given the same reference numerals with a "2" prefix and will not be described in great detail.

The assembly 252 includes a rotor 254, a stator 260, a magnet 256 and a coil 258, all performing the same functions as their counterparts in assembly 52 described above. The assembly cooperates with a ferromagnetic bearing adjuster 236 which defines a portion of the flux path 108. Surface 276 of rotor 254 abuts surface 236(c) of the adjuster.

Assembly 252 differs from assembly 52 principally in that teeth 282 are axially extending and are axially, not radially, separated from the teeth 100 of stator 260 to define an axially, not radially, extending air gap or working gap 2102.

It has been found that a sensor assembly with an axially extending air gap is more tolerant of radial run out between the relatively rotating component.

A spacer or thrust washer, which may be of self-lubricating material such as teflon or the like, 200 may be utilized to maintain a minimum axial separation between the rotor teeth 282 and stator teeth 100.

Further advantages of the annular speed sensor are that the speed sensor is less susceptible to run out noise generation (both AM and FM), there is less noise resulting from tooth to tooth variation which allows the use of lower precision, less costly rotors and a higher output is possible due to the availability of large magnet volume and efficient magnetic circuit allowing the use of smaller diameter rotors, larger gaps, fewer turns of wire and/or less expensive magnets.

It is also noted, that by utilization of the existing ferromagnetic bearing adjustor 36 as a portion of the annular speed sensor magnetic flux path 108 an additional ferromagnetic member need not be supplied with resulting savings in weight and cost.

Although the preferred embodiment of the present invention has been described with a certain degree of particularity, it is understood, of course, that certain substitutions for rearrangement of the parts may be resorted to without departing from the spirit and the scope of the present invention as hereinafter claimed.

We claim:

1. An annular rotational speed sensor assembly (52) for sensing the rotational speed of a shaft (18, 20) passing through a bore (36B) in a fixed ferromagnetic member (36), said ferromagnetic member defining a generally flat face (36C) surrounding said bore and generally perpendicular to the axis of rotation (28) of said shaft, said assembly comprising:

a ferromagnetic rotor (54) mountable to said shaft for joint rotation therewith, said rotor defining a generally flat surface (76) parallel to and abuttable with said face and a first annular array of teeth (82) extending radially therefrom;

a ferromagnetic stator (60) mountable to said ferromagnetic member and defining a second annular array of teeth (100) axially aligned with said first annular array of teeth, said second array of teeth extending radially towards said first array of teeth to define a minimum average air gap (102) therebetween; the axially aligned portions of said arrays of teeth axially spaced from said surface by at least a predetermined axial distance (112);

a substantially annular magnet (56) axially interposed said stator and said face, said substantially annular magnet surrounding and radially spaced from said rotor by a radial distance (116) considerably greater than said average minimum air gap;

an annular coil member (58) axially interposed said face and said arrays (82, 100) of teeth and radially interposed said substantially annular magnet and said ferromagnetic rotor; and a cover member (62) of magnetically nonconductive material mountable to said ferromagnetic member, said stator and coil member comprising a subassembly with said cover member, an annular magnetic flux path (108) defined around said coil, said flux path defined by flux travel across the interface of said face and said surface, across said air gap from said first array of teeth to said second array of teeth, from said stator to said magnetic member, from said magnetic member to said face at an interface radially spaced from said interface of said face and said surface, and through said ferromagnetic member to said interface of said face and said surface.

2. An annular rotational speed sensor assembly (52) for sensing the rotational speed of a shaft (18, 20) passing through a bore (36B) in a fixed ferromagnetic member (36), said ferromagnetic member defining a generally flat face (36C) surrounding said bore and generally perpendicular to the axis of rotation (28) of said shaft, said assembly comprising a ferromagnetic rotor (54) mountable to said shaft for joint rotation therewith, a first annular array of teeth (82) extending from said rotor, a ferromagnetic stator (60) mountable to said ferromagnetic member and defining a second annular array of teeth (100) axially aligned with said first annular array of teeth, said second array of teeth extending radially towards said first array of teeth to define a minimum average air gap (102) therebetween, a substantially annular magnet (56) and an annular coil member (58), said assembly characterized by:

said magnet and said coil are axially interposed said face and the axially aligned portions of said arrays of teeth, said coil telescopically surrounds a portion of said rotor and said magnet telescopically surrounds said coil; and said assembly is mounted directly to said ferromagnetic member and said air gap is axially separated from said member whereby a flux path is defined wherein said air gap and said ferromagnetic member define separate portions, connected in series, of said flux path.

3. An annular rotational speed sensor assembly (252) for sensing the rotational speed of a shaft (18, 20) passing through a bore (36B) in a fixed ferromagnetic member (236), said ferromagnetic member defining a generally flat face (236C) surrounding said bore and generally perpendicular to the axis of rotation (28) of said shaft, said assembly comprising:

a ferromagnetic rotor (254) mountable to said shaft for joint rotation therewith, said rotor defining a generally flat surface (276) parallel to and abuttable with said face and a first annular array of teeth (82) extending axially therefrom;

a ferromagnetic stator (260) mountable to said ferromagnetic member and defining a second annular array of teeth (100) radially aligned with said first annular array of teeth, said second array of teeth extending axially towards said first array of teeth to define a minimum average air gap (2102) therebetween; said arrays of teeth axially spaced from said surface by at least a predetermined axial distance;

a substantially annular magnet (56) axially interposed said stator and said face, said substantially annular magnet surrounding and radially spaced from said rotor by a radial distance (116) considerably greater than said average minimum air gap; and an annular coil member (58) axially interposed said face and said arrays (82, 100) of teeth and radially interposed said substantially annular magnet and said ferromagnetic rotor and a cover member (262) of magnetically nonconductive material mountable to said ferromagnetic member, said stator and coil member comprising a subassembly with said cover member;

an annular magnetic flux path (108) is defined around said coil, said flux path defined by flux travel across the interface of said face and said surface, across said air gap from said first array of teeth to said second array of teeth, from said stator to said magnetic member, from said magnetic member to said face at an interface radially spaced from said interface of said face and said surface, and through said ferromagnetic member to said interface of said face and said surface.

4. The assembly of claim 1 wherein said cover member comprises an axially extending portion radially surrounding said magnet and stator and a radially extending portion extending radially inwardly from said axially extending portion at a point spaced axially more distant from said face than said arrays.

5. The assembly of claim 1 wherein the axial separation (110) of the axially aligned portions of said arrays of of teeth and said surface (76) exceeds the axial thickness (112) of said coil member.

6. The assembly of claim 1 wherein the axial separation (110) of the axially aligned portions of said arrays of of teeth and said surface (76) exceeds the axial thickness (112) of said magnet.

7. The assembly of claim 2 further comprising a cover member (62) of magnetically nonconductive material mountable to said ferromagnetic member, said stator and coil member comprising a subassembly with said cover member.

8. The assembly of claim 7 wherein said cover member is attached to said ferromagnetic member by means of magnetically nonconductive threaded fasteners (64).

9. The assembly of claims 2 wherein said stator is mounted to said ferromagnetic member with a degree of relative movement in the radial direction relative to the axis of rotation (24) of said rotor.

10. An annular, drive axle, in-axle wheel rotational speed sensor assembly (52) for sensing the rotational speed of an axle shaft (18, 20) passing through a bore (36B) in a ferromagnetic bearing adjuster (36) fixed to said drive axle, said adjuster defining a generally flat outboardly facing face (36C) surrounding said bore and extending generally perpendicular to the axis of rotation (28) of said shaft:
- a generally tubularly shaped ferromagnetic rotor (54) mountable to said shaft for joint rotation therewith, said rotor defining an inboardly facing generally flat surface (76) parallel to and substantially abuttable with said face and a first annular array of teeth (82) extending radially outwardly from the outer diameter surface thereof;
- a ferromagnetic stator (60) mountable to said adjuster and defining a second annular array of teeth (100) axially aligned with said first annular array of teeth, said second array of teeth extending radially inwardly towards said first array of teeth to define a minimum average air gap (102) therebetween; said air gap between said arrays of teeth axially spaced from said surface by at least a predetermined axial distance (110);
- a substantially annular magnet (56) axially interposed said stator and said face, said substantially annular magnet surrounding and radially spaced from the outer diameter surface of said rotor by a radial distance (116) considerably greater than the length of said average minimum air gap; and
- an annular coil member (58) axially interposed said face and said arrays (82, 100) of teeth and radially interposed said substantially annular magnet and said ferromagnetic rotor.

11. The assembly of claim 10 wherein an annular magnetic flux path (108) is defined around said coil, said flux path defined by flux travel across said air gap said face and said surface, through said rotor from said surface to said first array of teeth, from said first array of teeth to said second array of teeth, from said stator to said magnetic member, from said magnetic member to said face at an interface radially spaced from said interface of said face and said surface, and through said ferromagnetic member to said interface of said face and said surface.

12. The assembly of claim 11 wherein said magnet defines an inboardly facing surface (96) in abutting relation with said face and an outboardly facing surface (98) in abutting relationship with an inboardly facing surface of said stator.

13. The assembly of claims 10, 11 or 12 further comprising a cover member (62) of magnetically nonconductive material mountable to said ferromagnetic member, said stator, and coil member comprising a subassembly with said cover member.

14. The assembly of claims 10, 11 or 12 further comprising a cover member of magnetically nonconductive material mounted to said ferromagnetic member, said cover member comprising an axially extending portion radially surrounding said magnet and stator and a radially extending portion extending radially inwardly from said axially extending portion at a point spaced axially more distant from said face than said arrays.

15. The assembly of claims 10, 11 or 12 wherein said rotor defines a bore for receipt of said shaft, said rotor having an axial extension extending from said first array axially outboardly and defining a radially inwardly chamfered inner diameter surface (88) to guide said shaft into said bore.

16. The assembly of claim 15 wherein the inner diameter of said bore includes a plurality of inwardly extending projections (90) adapted to engage complimentary outwardly extending projections (18A) provided on said shaft.

17. The assembly of claims 10, 11 or 12 wherein said assembly is mounted in a counterbore (74) of said face.

18. The assembly of claims 10, 11 or 12 wherein said stator is mounted to said ferromagnetic member with a degree of relative movement in the radial direction relative to the axis of rotation (24) of said rotor.

19. An annular rotational speed sensor assembly (52) for sensing the rotational speed of an axle shaft (18, 20) passing through a bore (36B) in a fixed ferromagnetic drive axle bearing adjuster (36), said assembly including:
- a ferromagnetic rotor (54) mountable to said shaft for joint rotation therewith, said rotor defining a first annular array of teeth (82) extending therefrom;
- a ferromagnetic stator (60) mountable to said adjuster and defining a second annular array of teeth (100) aligned with said first annular array of teeth, said second array of teeth extending towards said first array of teeth to define a minimum average air gap (102) therebetween;
- a substantially annular magnet (56); and
- an annular coil member (58);
said assembly characterized by:
- a flux path defined by said assembly when said arrays are in tooth to tooth alignment, said adjuster defining a portion of said flux path.

20. The assembly of claim 3 wherein the axial separation (110) of the axial air gap (2102) defined between said arrays of of teeth and said surface (276) exceeds the axial thickness of said magnet.

21. The assembly of claims 3 wherein a spacer (200) is utilized to maintain a predetermined minimum axial separation between said arrays of teeth.

22. The assembly of claims 3 or 20 wherein said rotor defines a bore having an inner diameter for receipt of said shaft, said rotor having an axial extension extending from said first array axially away from said surface and defining a radially inwardly chamfered surface to guide said shaft into said bore.

23. An annular rotational speed sensor assembly (52) for sensing the rotational speed of a shaft (18, 20) passing through a bore (36B) in a fixed ferromagnetic member (36), said ferromagnetic member defining a generally flat face (36C) surrounding said bore and generally perpendicular to the axis of rotation (28) of said shaft, said assembly comprising a ferromagnetic rotor (54) mountable to said shaft for joint rotation therewith, a first annular array of teeth (82) extending from said rotor, a ferromagnetic stator (60) mountable to said ferromagnetic member and defining a second annular array of teeth (100) aligned with said first annular array of teeth, said second array of teeth extending towards said first array of teeth to define a minimum average air gap (102) therebetween, a substantially annular magnet (56) and an annular coil member (58), said assembly characterized by:

said magnet and said coil are axially interposed said face and said air gap, said coil telescopically surrounds a portion of said rotor and said magnet telescopically surrounds said coil; and said assembly is mounted directly to said ferromagnetic member and said air gap is axially separated from said member whereby a flux path (108) is defined wherein said air gap and said ferromagnetic member define separate portions, connected in series, of said flux path.

24. The assembly of claim 23 further comprising a cover member (62) of magnetically nonconductive material mountable to said ferromagnetic member, said stator and coil member comprising a subassembly with said cover member.

25. The assembly of claim 24 wherein said cover member is attached to said ferromagnetic member by means of magnetically nonconductive threaded fasteners (64).

26. The assembly of claim 23 wherein said stator is mounted to said ferromagnetic member with a degree of relative movement in the radial direction relative to the axis of rotation (24) of said rotor.

27. An annular, drive axle, in-axle wheel rotational speed sensor assembly (52) for sensing the rotational speed of an axle shaft (18, 20) passing through a bore (36B) in a ferromagnetic bearing adjuster (36) fixed to said drive axle, said adjuster defining a generally flat outboardly facing face (36C) surrounding said bore and extending generally perpendicular tot he axis of rotation (28) of said shaft:

a generally tubularly shaped ferromagnetic rotor (54) mountable to said shaft for joint rotation therewith, said rotor defining an inboardly facing generally flat surface (76) parallel to sand substantially abuttable with said face and a first annular array of teeth (82) extending outwardly from an outer surface thereof;

a ferromagnetic stator (60) mountable to said adjuster and defining a second annular array of teeth (100) aligned with said first annular array of teeth, said second array of teeth extending inwardly towards said first array of teeth to define a minimum average air gap (102) therebetween; said air gap between said arrays of teeth axially spaced from said surface by at least a predetermined axial distance (110);

a substantially annular magnet (56) axially interposed said stator and said face, said substantially annular magnet surrounding and radially spaced from the outer diameter surface of said rotor by a radial distance (116) considerably greater than the length of said average minimum air gap; and an annular coil member (58) axially interposed said face and said arrays (82, 100) of teeth and radially interposed said substantially annular magnet and said ferromagnetic rotor.

28. The assembly of claim 27 wherein an annular magnetic flux path (108) is defined around said coil, said flux path defined by flux travel across said air gap said face and said surface, through said rotor from said surface to said first array of teeth, from said first array of teeth to said second array of teeth, from said stator to said magnetic member, from said magnetic member to said face at an interface radially spaced from said interface of said face and sad surface, and through said ferromagnetic member to said interface of said face and said surface.

29. The assembly of claim 28 wherein said magnet defines an inboardly facing surface (96) in abutting relation with said face and an outboardly facing surface (98) in abutting relationship with an inboardly facing surface of said stator.

* * * * *